(12) United States Patent
Sheynblat

(10) Patent No.: US 6,307,504 B1
(45) Date of Patent: Oct. 23, 2001

(54) METHOD AND SYSTEM FOR USING ALTITUDE INFORMATION IN A SATELLITE POSITIONING SYSTEM

(75) Inventor: Leonid Sheynblat, Belmont, CA (US)

(73) Assignee: SnapTrack, Inc., Campbell, CA (US)

( * ) Notice: Subject to any disclaimer, the term of this patent is extended or adjusted under 35 U.S.C. 154(b) by 0 days.

(21) Appl. No.: 09/532,403

(22) Filed: Mar. 22, 2000

Related U.S. Application Data

(62) Division of application No. 09/073,107, filed on May 5, 1998, now Pat. No. 6,061,018.

(51) Int. Cl.[7] ............................. G01S 5/02; H04B 7/185
(52) U.S. Cl. ...................... 342/357.06; 342/462; 701/213
(58) Field of Search ......................... 342/357.01, 357.06, 342/462, 357.11; 701/213; 455/422

(56) References Cited

U.S. PATENT DOCUMENTS

| 4,445,118 | 4/1984 | Taylor et al. .................. 343/357 |
| 4,457,006 | 6/1984 | Maine .................................... 375/87 |

(List continued on next page.)

FOREIGN PATENT DOCUMENTS

| 4424412 | 7/1994 | (DE) . |
| 0444738 | 9/1991 | (EP) . |

(List continued on next page.)

OTHER PUBLICATIONS

PCT International Search Report for Int'l appln No. PCT/US97/21260, mailed Nov. 20, 1997.
PCT International Search Report for Int'l appln No. PCT/US97/03512, mailed Jul. 11, 1997.
PCT Invitation to Pay Additional Fees for Int'l appln No. PCT/US96/16161, mailed to Mar. 1997.
PCT International Search Report for Int'l appln. No. PCT/US96/16178, mailed Feb. 21, 1997.
PCT International Search Report for Int'l appln. No. PCT/US96/16161, mailed May 13, 1997.

(List continued on next page.)

*Primary Examiner*—Dao Phan
(74) *Attorney, Agent, or Firm*—Blakely, Sokoloff, Taylor & Zafman

(57) ABSTRACT

A method and apparatus for determining a position of a mobile satellite positioning system (SPS) receiver. In one example of a method, a cell object information is determined; this cell object information comprises at least one of a cell object location or a cell object identification. An altitude is determined from the cell object information which is selected based upon a cell site transmitter which is in wireless communication with a cell based communication system which is coupled to (and typically integrated with) the mobile SPS receiver. The position of the mobile SPS receiver is calculated using the altitude which is determined from the cell object information. In another example of a method, an altitude pseudomeasurement is determined from an estimate of an altitude of the mobile SPS receiver. This estimate of the altitude may be from a cell based information source in a cell based system or may be an average altitude of the area of radio coverage of a wireless basestation in the non-cell based system. The altitude pseudomeasurement may be used as a redundant measurement with fault detection and isolation techniques to determine whether at least one pseudorange has a faulty condition. Alternatively (or in addition), a comparison of the estimated altitude to a calculated altitude determines a condition of at least one pseudorange between an SPS satellite and the mobile SPS receiver. In one embodiment of this example, the position is determined from a position solution algorithm, and if the condition is a first state (not a fault state) the at least one pseudorange is used in the position solution algorithm

7 Claims, 9 Drawing Sheets

U.S. PATENT DOCUMENTS

| | | | |
|---|---|---|---|
| 4,601,005 | 7/1986 | Kilvington | 364/602 |
| 4,701,934 | 10/1987 | Jasper | 375/1 |
| 4,785,463 | 11/1988 | Jane et al. | 375/1 |
| 4,797,677 | 1/1989 | MacDoran et al. | 342/352 |
| 4,959,656 | 9/1990 | Kumar | 342/418 |
| 4,998,111 | 3/1991 | Ma et al. | 342/352 |
| 5,043,736 | 8/1991 | Darnell et al. | 342/357 |
| 5,119,102 | 6/1992 | Barnard | 342/357 |
| 5,153,598 | 10/1992 | Alves, Jr. | 342/352 |
| 5,202,829 | 4/1993 | Geier | 364/449 |
| 5,210,540 | 5/1993 | Masumoto | 342/357 |
| 5,223,844 | 6/1993 | Mansell et al. | 342/357 |
| 5,225,842 | 7/1993 | Brown et al. | 342/357 |
| 5,245,634 | 9/1993 | Averbuch | 375/108 |
| 5,265,025 | 11/1993 | Hirata | 364/449 |
| 5,271,034 | 12/1993 | Abaunza | 375/1 |
| 5,311,194 | 5/1994 | Brown | 342/357 |
| 5,317,323 | 5/1994 | Kennedy et al. | 342/457 |
| 5,323,163 | 6/1994 | Maki | 342/357 |
| 5,323,322 | 6/1994 | Mueller et al. | 364/449 |
| 5,359,521 * | 10/1994 | Kyrtsos et al. | 364/449 |
| 5,365,450 | 11/1994 | Schuchman et al. | 364/449 |
| 5,379,047 | 1/1995 | Yokev et al. | 342/457 |
| 5,379,224 | 1/1995 | Brown et al. | 364/449 |
| 5,379,320 | 1/1995 | Fernandes et al. | 375/1 |
| 5,412,388 | 5/1995 | Attwood | 342/357 |
| 5,416,797 | 5/1995 | Gilhousen et al. | 375/705 |
| 5,420,592 | 5/1995 | Johnson | 342/357 |
| 5,430,654 * | 7/1995 | Kyrtsos et al. | 364/449 |
| 5,430,759 | 7/1995 | Yokev et al. | 375/202 |
| 5,448,773 | 9/1995 | McBurney et al. | 455/343 |
| 5,483,549 | 1/1996 | Weinberg et al. | 375/200 |
| 5,491,486 | 2/1996 | Welles, II et al. | 342/357 |
| 5,515,062 | 5/1996 | Maine et al. | 342/457 |
| 5,519,760 | 5/1996 | Borkowski et al. | 379/59 |
| 5,587,715 * | 12/1996 | Lewis | 342/357 |
| 5,663,734 | 9/1997 | Krasner | 342/357 |
| 5,969,669 * | 10/1999 | Ishikawa et al. | 342/357.02 |
| 5,999,124 * | 12/1999 | Sheynblat | 342/357.09 |
| 5,999,129 * | 12/1999 | Rose | 342/394 |
| 6,067,484 * | 5/2000 | Rowson et al. | 701/16 |

FOREIGN PATENT DOCUMENTS

| | | |
|---|---|---|
| 0447978 | 9/1991 | (EP) . |
| 0512789 | 11/1992 | (EP) . |
| 0545636 | 6/1993 | (EP) . |
| 2273218 | 6/1994 | (GB) . |
| 2308033 | 6/1997 | (GB) . |
| WO9714049 | 4/1994 | (WO) . |
| WO9428434 | 12/1994 | (WO) . |
| WO9615636 | 5/1996 | (WO) . |
| WO9714056 | 4/1997 | (WO) . |

OTHER PUBLICATIONS

Peterson, et al. "GPS Receiver Structures for the Urban Canyon," ION–GPS–95, Session C4, Land Vehicular, Applications, Palm Springs, CA, Sep. 1995.

Raab, et al. "An Application of the Global Positioning System to Search and Rescue and Remote Tracking," *Navigation; Journal of the Institute of Navigation*, 24:3, 1977.

Rogers & Anson, "Animal–borne GPS: Tracking the Habitat," *GPS World*, pp. 21 & 22, Jul. 1994.

"RTCM Recommended Standards for Differential Navstar GPS Service, Version 2.0," *Radio Technical Commission for Maritime Services*, Jan. 1, 1990.

U.S. Pat. application Ser. No. 08/759,523, filed Dec. 4, 1996 and entitled "An Improved GPS Receiver Utilizing a Communication Link", 47 pages and 14 sheets of drawings.

Davenport, Robert G. "FFT Processing of Direct Sequence Spreading Codes . . . " IEEE 1991, National Aerospace and Electronics Conference NAECON 1991, vol. 1 pp. 98–105, May 1991.

Sturza, Mark A. "Navigation System Integrity Monitoring Using Redundant Measurements," Navigation: Journal of The Institute of Navigation, 35:4, Winter 1988–89, pp. 483–501.

"Global Positioning System: Theory and Applications," vol. II. edited by B.W. Parkinson and J.J. Spilker, Chapter 5 (pp. 143–165) and Table of Contents (pp. ix–xx), 1996.

"Global Positioning System: Theory and Applications," vol. II. edited by B.W. Parkinson and J.J. Spilker, Chapter 8 (pp. 221–243) and Table of Contents (pp. ix–xx), 1996.

"Navstar GPS User Equipment, Introduction," *NATO*, Feb. 1991 (entire volume).

"Navigation: Journal of the Institute of Navigation," *The Institute of Navigation*, 25:2, 1978 (entire edition).

PCT International Search Report for PCT Appln. No. PCT/US99/08270 mailed Oct. 25, 1999.

* cited by examiner

| Cell Based Information Source | | | |
|---|---|---|---|
| Cell Service Area | Cell Site # | Cell Site Location | Estimated Altitude |
| A | - | Lat./Long. A | Alt A1 |
| B | B1 | - | Alt B1 |
| B | B2 | Lat./Long. B2 | Alt B2 |

FIG. 4

METHOD AND SYSTEM FOR USING ALTITUDE INFORMATION IN A SATELLITE POSITIONING SYSTEM

This application is a divisional application of U.S. patent application Ser. No. 09/073,107, which was filed on May 5, 1998 and is now U.S. Pat. No. 6,061,018.

BACKGROUND OF THE INVENTION

The present invention relates to satellite positioning systems which use augmentation or aiding from information regarding the altitude of a satellite positioning system receiver.

Conventional satellite positioning systems (SPS) such as the U.S. Global Positioning System (GPS) use signals from satellites to determine their position. Conventional SPS receivers normally determine their position by computing relative times of arrival of signals transmitted simultaneously from a multiplicity of GPS satellites which orbit the earth. These satellites transmit, as part of their message, both satellite positioning data as well as data on clock timing which specifies the position of a satellite at certain times; this data is often referred to as satellite ephemeris data. Conventional SPS receivers typically search for and acquire the SPS signals, read the ephemeris data for a multiplicity of satellites, determine pseudoranges to these satellites, and compute the location of the SPS receivers from the pseudoranges and the ephemeris data from the satellites.

Conventional SPS systems sometimes use altitude aiding to assist in two situations: a case of bad satellite geometry, or a lack of measurements for three dimensional positioning. For most cases, bad satellite geometry is caused by poor observability in the vertical direction. For instance, if the unit vectors to all of the satellites being used in the solution lie on a cone of arbitrary half-angle, then it is possible to place a plane on the top of the tips of the unit vectors if the unit vectors only span a two-dimensional space. The error in the third direction or dimension, which is perpendicular to the plane, is unobservable; this is referred to as a singularity condition. In urban canyon environments with tall buildings surrounding the GPS receiver antenna, the only satellites that are visible are those at high elevation angles. These signal conditions are similar to the singularity condition described herein. Also, large multi-path errors tend to cause large errors in the vertical direction.

Conventional altitude aiding is based on a pseudomeasurement of the altitude that can be visualized as a surface of a sphere with its center at the center of the earth. This sphere has a radius which includes the earth's radius and an altitude with respect to the earth's surface which is typically defined by an ellipsoid (WGS84 is one of the ellipsoidal models). There are numerous techniques which are available to perform altitude aiding, but all techniques rely on an a priori knowledge of the altitude required to define the surface of a sphere which is a magnitude of the altitude pseudomeasurement Typically, an estimated altitude can be manually supplied by the operator of the GPS receiver or can be set to some preset value, such as the surface of the earth or be set to an altitude from a previous three-dimensional solution.

Prior GPS technology has also used altitude aiding in the case where a mobile GPS receiver receives GPS signals but does not compute its position, and relies upon a basestation to perform the position calculations for it U.S. Pat. No. 5,225,842 describes such a system which uses altitude aiding in order to allow the use of only three GPS satellites.

The estimated altitude is typically derived from mapping information such as a topological or geodetic database. In this configuration, the altitude information of a basestation may also be available.

A weakness of this approach is that an initial two-dimensional solution is typically made before an altitude aiding with a reasonable altitude estimate can be applied. The altitude can then be extracted from a vertical database as a function of latitude and longitude coordinates.

While the foregoing approaches provide certain advantages from the use of altitude information, they do not work well in the case of a distributed processing system where a mobile GPS receiver may be located in any position over a relatively large geographical area. Moreover, these prior approaches use altitude information with all available pseudoranges even if a particular pseudorange is faulty.

SUMMARY OF THE INVENTION

The present invention provides various methods and apparatuses for determining a position of a mobile satellite positioning system (SPS) receiver with the use of altitude information. In one example of a method of the present invention, a cell object information is determined. This cell object information comprises at least one of a cell object location or a cell object identification. In one example, the cell object may be a cell site and the identification may be an identifier of the cell site and the location may be the latitude and longitude of the cell site. An altitude is determined from the cell object information which is selected based upon a cell site transmitter which is in wireless communication with a cell based communication system which is coupled to (and typically integrated with) the mobile SPS receiver. That is, the altitude is determined from a cell object information which is associated with the cell site transmitter which is in communication with the communication system of the mobile SPS receiver. The position of the mobile SPS receiver is calculated using the altitude which is determined from the cell object information.

In another example of a method according to the present invention, an altitude pseudomeasurement is determined, and this pseudomeasurement uses an estimate of an altitude of the mobile SPS receiver. This estimate of the altitude may be derived from a cell based information source in a cell based communication system or may be an average altitude or other mathematical representation of altitude or altitudes of an area of coverage of a wireless basestation in a non-cell based system. In one implementation, a comparison of the estimate of the altitude to an altitude that is calculated from pseudoranges to SPS satellites (or from pseudoranges and the altitude pseudomeasurement) determines the condition of at least one pseudorange between an SPS satellite and the mobile SPS receiver. In another implementation, the altitude pseudomeasurement may be used as a redundant measurement (with pseudoranges to SPS satellites) and fault detection and isolation techniques may be employed using the redundant measurement to determine the condition (e.g. faulty or non-faulty) of at least one of the pseudoranges or a navigation solution. In one embodiment of this example, the position is determined from a position solution algorithm, and if the condition of a pseudorange is in a first state, such as a non-fault state, the at least one pseudorange is used in the position solution algorithm. A recomputation of a navigation solution may be performed using only non-faulty pseudoranges (after faulty pseudoranges have been identified and excluded from a re-computation of a navigation solution).

Various mobile SPS receivers and basestations are also described herein. Various other aspects and embodiments of the present invention are further described below.

BRIEF DESCRIPTION OF THE DRAWINGS

The present invention is illustrated by way of example and not limitation in the figures of the accompanying drawings in which like references indicate similar elements.

FIG. 4 illustrates an example of a cell based information source which may be used to determine an estimated altitude of a mobile SPS receiver.

DETAILED DESCRIPTION

The present invention provides various methods and apparatuses for using altitude aiding with satellite positioning systems. The following description and drawings are illustrative of the invention and are not to be construed as limiting the innovation. Numerous specific details are described to provide a thorough understanding of the present invention. However, in certain instances, well known or conventional details are not described in order to not unnecessarily obscure the present invention in detail.

Before describing various details with respect to the use of altitude aiding information, it will be useful to describe the context in which one aspect of the present invention is used. Accordingly, a preliminary discussion which refers to FIGS. 1, 2, 3A, and 3B will be provided before discussing the use of altitude aiding in a cell based communication system.

Figure 1:
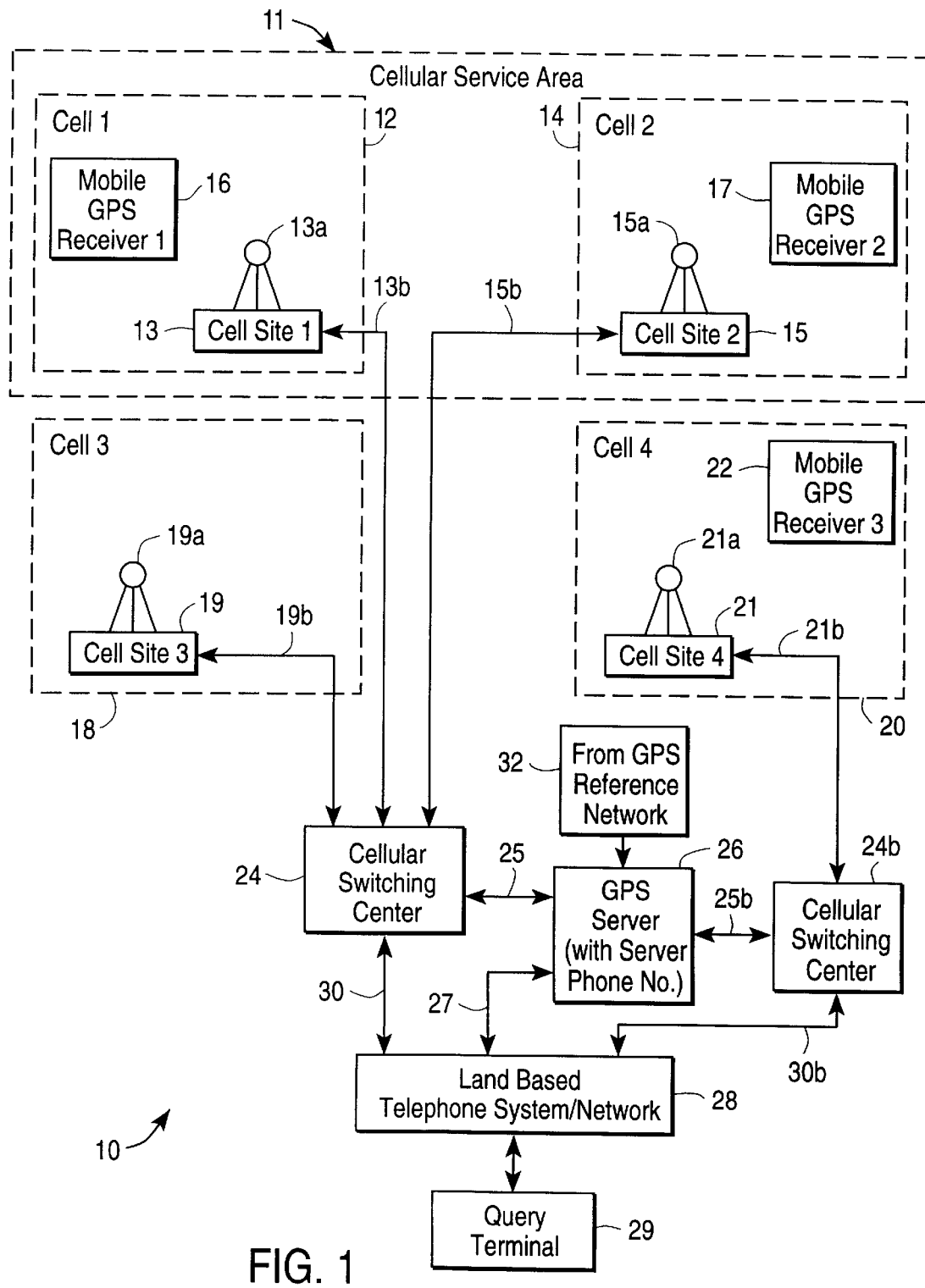
FIG. 1 illustrates a cell based communication system having a plurality of cells each of which is serviced by a cell site, and each of which is coupled to a cell based switching center, which is sometimes referred to as a mobile switching center.

FIG. 1 shows an example of a cell based communication system 10 which includes a plurality of cell sites, each of which is designed to service a particular geographical region or location. Examples of such cellular based or cell based communication systems are well known in the art, such as the cell based telephone systems. The cell based communication system 10 includes two cells 12 and 14, both of which are defined to be within a cellular service area 11. In addition, the system 10 includes cells 18 and 20. It will be appreciated that a plurality of other cells with corresponding cell sites and/or cellular service areas may also be included in the system 10 coupled to one or more cellular switching centers, such as the cellular switching center 24 and the cellular switching center 24b.

Figure 3A:
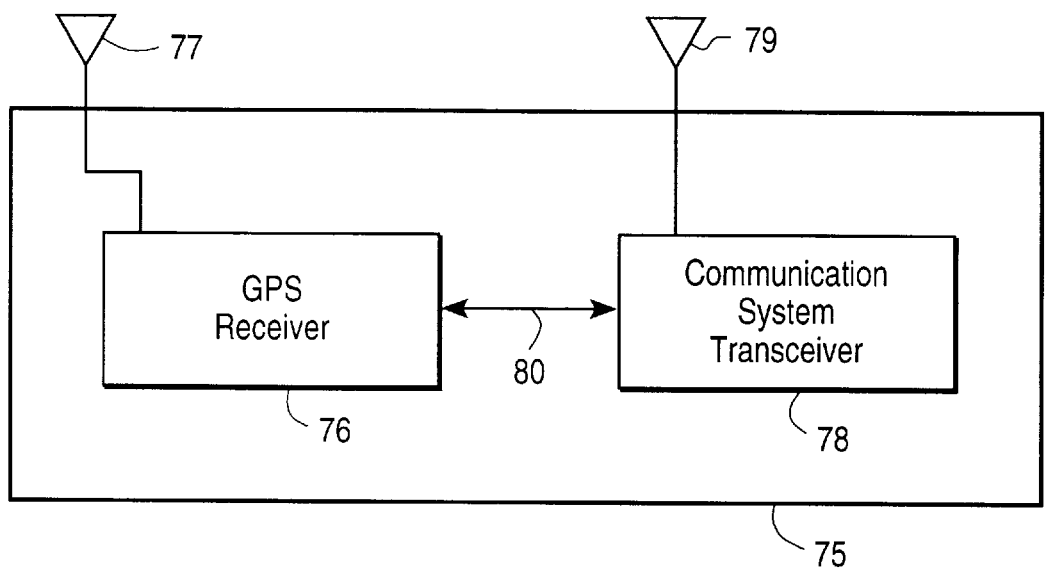
FIG. 3A illustrates an example of a combined SPS receiver and communication system according to one embodiment of the present invention.

Within each cell, such as the cell 12, there is a wireless cell or cellular site such as cell site 13 which includes an antenna 13a which is designed to communicate through a wireless communication medium with a communication receiver which may be combined with a mobile GPS receiver such as the receiver 16 shown in FIG. 1. An example of such a combined system having a GPS receiver and a communication system is shown in FIG. 3A and may include both a GPS antenna 77 and a communication system antenna 79.

Each cell site is coupled to a cellular switching center. In FIG. 1, cell sites 13, 15, and 19 are coupled to switching center 24 through connections 13b, 15b and 19b respectively and cell site 21 is coupled to a different switching center 24b through connection 21b. These connections are typically wire line connections between the respective cell site and the cellular switching centers 24 and 24b. Each cell site includes an antenna for communicating with communication systems serviced by the cell site. In one example, the cell site may be a cellular telephone cell site which communicates with mobile cellular telephones in the area serviced by the cell site. It will be appreciated that a communication system within one cell, such as receiver 22 shown in cell 4, may in fact communicate with cell site 19 in cell 18 due to signal blockage (or other reasons why cell site 21 cannot communicate with the receiver 22). It is also true that multiple cell sites may be communicating data (but usually not voice) with a mobile GPS receiver which includes a communication system.

In a typical embodiment of the present invention, the mobile GPS receiver 16 includes a cell based communication system which is integrated with the GPS receiver such that both the GPS receiver and the communication system are enclosed in the same housing. One example of this is a cellular telephone having an integrated GPS receiver which shares common circuitry with the cellular telephone transceiver. When this combined system is used for cellular telephone communications, transmissions occur between the receiver 16 and the cell site 13. Transmissions from the receiver 16 to the cell site 13 are then propagated over the connection 13b to the cellular switching center 24 and then to either another cellular telephone in a cell serviced by the cellular switching center 24 or through a connection 30 (typically wired) to another telephone through the land-based telephone system/network 28. It will be appreciated that the term wired includes fiber optic and other non wireless connections such as copper cabling, etc. Transmissions from the other telephone which is communicating with the receiver 16 are conveyed from the cellular switching center 24 through the connection 13b and the cell site 13 back to the receiver 16 in the conventional manner.

The remote data processing system 26 (which may be referred to in some embodiments as a SPS server or a location server) is included in the system 10 and is in one embodiment used to determine the position of a mobile SPS receiver (e.g. receiver 16) using SPS signals received by the SPS receiver. The SPS server 26 may be coupled to the land-based telephone system/network 28 through a connection 27, and it may also be optionally coupled to the cellular switching center 24 through the connection 25 (which may be a communication network) and also optionally coupled to center 24b through the connection 25b (which may be the same or a different communication network as connection 25). It will be appreciated that connections 25 and 27 are typically wired connections, although they may be wireless. Also shown as an optional component of the system 10 is a query terminal 29 which may consist of another computer system which is coupled through the network 28 to the SPS server 26. This query terminal 29 may send a request, for the position of a particular SPS receiver in one of the cells, to the SPS server 26 which then initiates a conversation with a particular SPS receiver through the cellular switching center in order to determine the position of the GPS receiver and report that position back to the query terminal 29. In another embodiment, a position determination for a GPS receiver may be initiated by a user of a mobile GPS receiver; for example, the user of the mobile GPS receiver may press 911 on the cell phone to indicate an emergency situation at the location of the mobile GPS receiver and this may initiate a location process in the manner described herein. In another embodiment of the present invention, each cell site may include a GPS location server which communicates data to and from a mobile GPS receiver through the cell site. The present invention may also be employed with different communication architectures such as point-to-point architectures which use non cell based systems.

It should be noted that a cellular based or cell based communication system is a communication system which has more than one transmitter, each of which serves a different geographical area, which is predefined at any instant in time. Typically, each transmitter is a wireless transmitter which serves a cell which has a geographical radius of less than 20 miles, although the area covered depends on the particular cellular system. There are numerous types of cellular communication systems, such as cellular telephones, PCS (personal communication system), SMR (specialized mobile radio), one-way and two-way pager systems, RAM, ARDIS, and wireless packet data systems. Typically, the predefined geographical areas are referred to as cells and a plurality of cells are grouped together into a cellular service area, such as the cellular service area 11 shown in FIG. 1, and these pluralities of cells are coupled to one or more cellular switching centers which provide connections to land-based telephone systems and/or networks. Service area are often used for billing purposes. Hence, it may be the case that cells in more than one service area are connected to one switching center. For example, in FIG. 1, cells 1 and 2 are in service area 11 and cell 3 is in service area 13, but all three are connected to switching center 24. Alternatively, it is sometimes the case that cells within one service area are connected to different switching centers, especially in dense population areas. In general, a service area is defined as a collection of cells within close geographical proximity to one another. Another class of cellular systems that fits the above description is satellite based, where the cellular basestations or cell sites are satellites that typically orbit the earth. In these systems, the cell sectors and service areas move as a function of time. Examples of such systems include Iridium, Globalstar, Orbcomm, and Odyssey.

Figure 2:
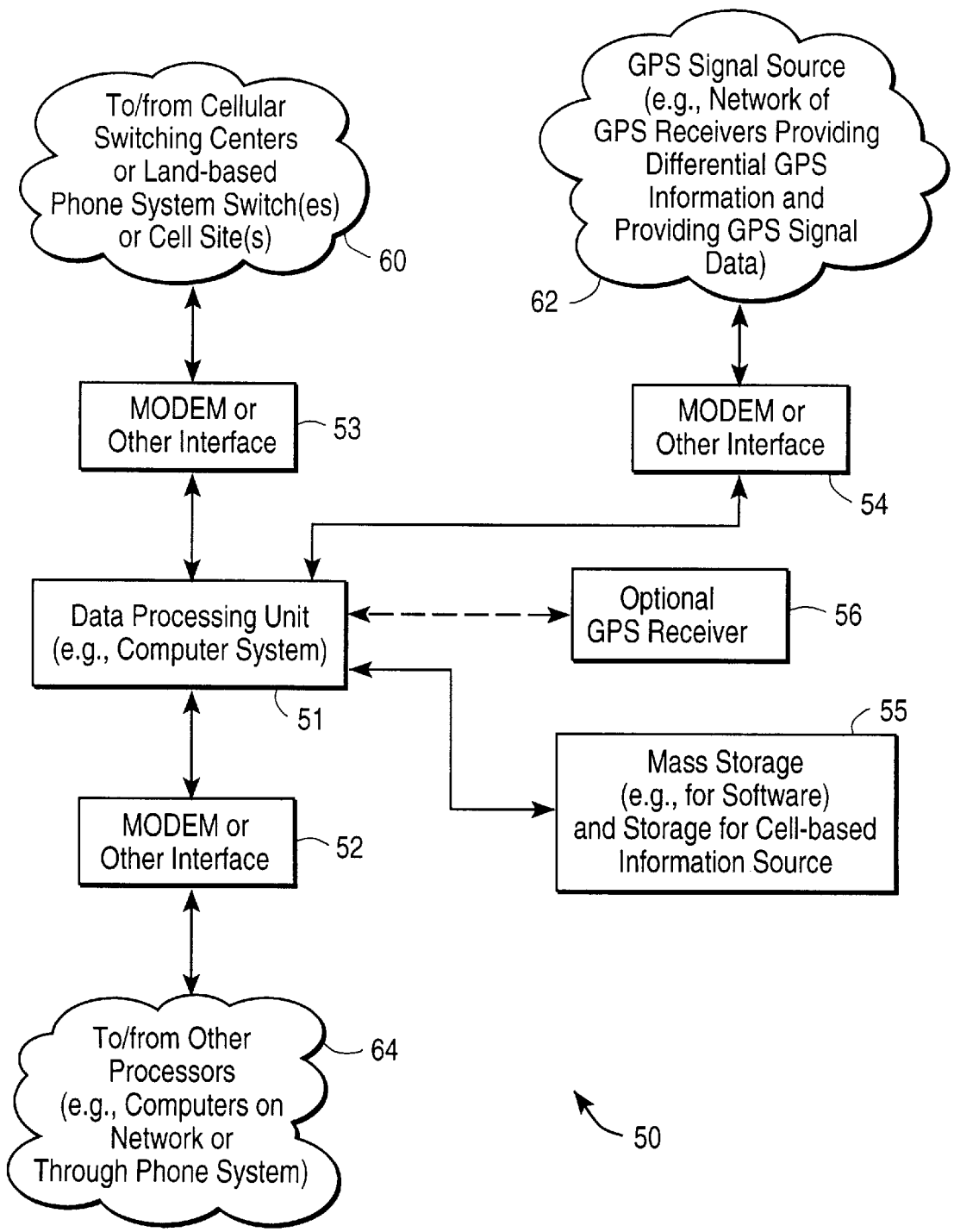
FIG. 2 illustrates an implementation of a location server system according to one embodiment of the invention.

FIG. 2 shows an example of a SPS server 50 which may be used as the SPS server 26 in FIG. 1. The SPS server 50 of FIG. 2 includes a data processing unit 51 which may be a fault-tolerant digital computer system. The SPS server 50 also includes a modem or other communication interface 52 and a modem or other communication interface 53 and a modem or other communication interface 54. These communication interfaces provide connectivity for the exchange of information to and from the location server shown in FIG. 2 between three different networks, which are shown as networks 60, 62, and 64. The network 60 includes the cellular switching center or centers and/or the land-based phone system switches or the cell sites. Thus the network 60 may be considered to include the cellular switching centers 24 and 24*b* and the land-based telephone system/network 28 and the cellular service area 11 as well as cells 18 and 20. The network 64 may be considered to include the query terminal 29 of FIG. 1 or the "PSAP," which is the Public Safety Answering Point which is typically the control center which answers 911 emergency telephone calls. In the case of the query terminal 29, this terminal may be used to query the server 26 in order to obtain a position information from a designated mobile SPS receiver located in the various cells of the cell based communication system. In this instance, the location operation is initiated by someone other than the user of the mobile GPS receiver. In the case of a 911 telephone call from the mobile GPS receiver which includes a cellular telephone, the location process is initiated by the user of the cellular telephone. The network 62, which represents the GPS reference network 32 of FIG. 1, is a network of GPS receivers which are GPS reference receivers designed to provide differential GPS correction information and also to provide GPS signal data including the satellite ephemeris data (typically as part of the entire raw satellite navigation message) to the data processing unit. When the server 50 serves a very large geographical area, a local optional GPS receiver, such as optional GPS receiver 56, may not be able to observe all GPS satellites that are in view of mobile SPS receivers throughout this area Accordingly, the network 62 collects and provides satellite ephemeris data (typically as part of the entire raw satellite navigation message) and differential GPS correction data applicable over a wide area in accordance with the present invention.

As shown in FIG. 2, a mass storage device 55 is coupled to the data processing unit 51. Typically, the mass storage 55 will include storage for data and software for performing the GPS position calculations after receiving pseudoranges from the mobile SPS receivers, such as a receiver 16 of FIG. 1. These pseudoranges are normally received through the cell site and cellular switching center and the modem or other interface 53. The mass storage device 55 also includes software, at least in one embodiment, which is used to receive and use the satellite ephemeris data provided by the GPS reference network 32 through the modem or other interface 54. The mass storage device 55 also typically includes a database which stores cell object information, such as cell site identifiers, cell site geographic location and corresponding altitudes which are typically the altitude(s) associated with a cell site geographic location and hence estimated altitudes for a mobile SPS receiver which is in radio communication with a particular cell site. This cell object information and corresponding altitudes is a cell based information source, an example of which is shown in FIG. 4 and is described further below.

In a typical embodiment of the present invention, the optional GPS receiver 56 is not necessary as the GPS reference network 32 of FIG. 1 (shown as network 62 of FIG. 2) provides the differential GPS information, GPS measurements as well as providing the raw satellite data messages from the satellites in view of the various reference receivers in the GPS reference network It will be appreciated that the satellite ephemeris data obtained from the network through the modem or other interface 54 may be normally used in a conventional manner with the pseudoranges obtained from the mobile GPS receiver in order to compute the position information for the mobile GPS receiver. The interfaces 52, 53, and 54 may each be a modem or other suitable communication interface for coupling the data processing unit to other computer systems, as in the case of network 64, and to cellular based communication systems, as in the case of network 60, and to transmitting devices, such as computer systems in the network 62. In one embodiment, it will be appreciated that the network 62 includes a dispersed collection of GPS reference receivers dispersed over a wide geographical region. In some embodiments, the differential GPS correction information, obtained from a receiver 56 near the cell site or cellular service area which is communicating with the mobile GPS receiver through the cellular based communication system, will provide differential GPS correction information which is appropriate for the approximate location of the mobile GPS receiver. In other cases, differential corrections from the network 62 may be combined to compute a differential correction appropriate to the location of the mobile SPS receiver.

FIG. 3A shows a generalized combined system which includes a GPS receiver and a communication system transceiver. In one example, the communication system transceiver is a cellular telephone. The system 75 includes a GPS receiver 76 having a GPS antenna 77 and a communication transceiver 78 having a communication antenna 79. The GPS receiver 76 is coupled to the communication transceiver 78 through the connection 80 shown in FIG. 3A. In one mode of operation, the communication system transceiver 78 receives approximate Doppler information through the antenna 79 and provides this approximate Doppler information over the link 80 to the GPS receiver 76 which performs the pseudorange determination by receiving the GPS signals from the GPS satellites through the GPS antenna 77. This pseudorange is then transmitted to a location server, such as the GPS server 26 shown in FIG. 1 through the communication system transceiver 78. Typically the communication system transceiver 78 sends a signal through the antenna 79 to a cell site which then transfers this information back to the GPS server, such as GPS server 26 of FIG. 1. Examples of various embodiments for the system 75 are known in the art. For example, U.S. Pat. No. 5,663,734 describes an example of a combined GPS receiver and communication system which utilizes an improved GPS receiver system. Another example of a combined GPS and communication system has been described in co-pending application Ser. No. 08/652,833, which was filed May 23, 1996. The system 75 of FIG. 3A, as well as numerous alternative communication systems having SPS receivers, may be employed with the methods of the present invention to operate with the GPS reference network of the present invention.

Figure 3B:
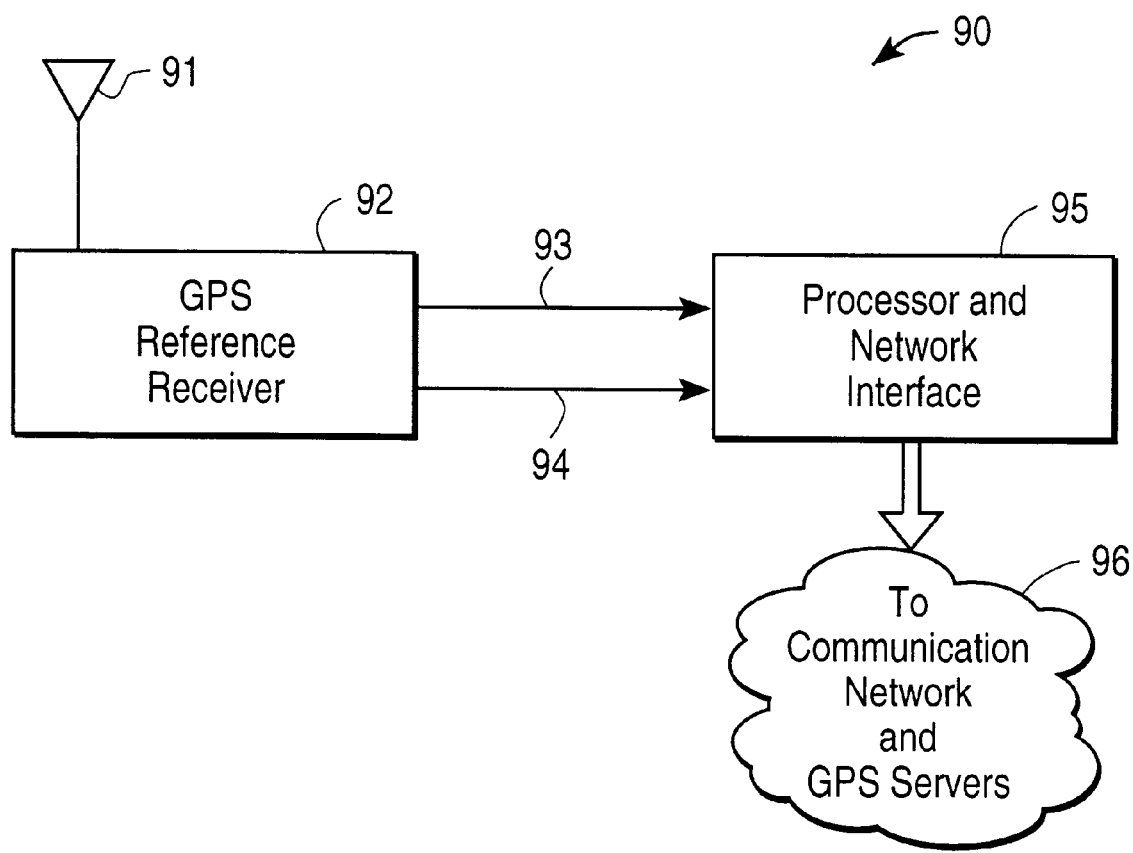
FIG. 3B illustrates an example of an SPS reference station according to one embodiment of the present invention.

FIG. 3B shows one embodiment for a GPS reference station. It will be appreciated that each reference station may be constructed in this way and coupled to the communication network or medium Typically, each GPS reference station, such as GPS reference station 90 of FIG. 3B, may include a dual frequency GPS reference receiver 92 which is coupled to a GPS antenna 91 which receives GPS signals from GPS satellites in view of the antenna 91. Alternatively, a GPS reference receiver may be a single frequency receiver, depending on the accuracy of correction required to cover an area of interest GPS reference receivers are well known in the art. The GPS reference receiver 92, according to one embodiment of the present invention, provides at least two types of information as outputs from the receiver 92. Pseudorange outputs 93 are provided to a processor and network interface 95, and these pseudorange outputs are used to compute pseudorange differential corrections in the conventional manner for those satellites in view of the GPS antenna 91. The processor and network interface 95 may be a conventional digital computer system which has interfaces for receiving data from a GPS reference receiver as is well known in the art. The processor 95 will typically include software designed to process the pseudorange data to determine the appropriate pseudorange correction for each satellite in view of the GPS antenna 91. These pseudorange corrections are then transmitted through the network interface to the communication network or medium 96 to which other GPS reference stations are typically also coupled. In another example of the invention, pseudorange data from the reference receiver is passed through the network 96 to a central location such as a GPS server 26 where differential corrections are computed. In yet another example, output 93 contains differential corrections generated by reference receiver 92. The GPS reference receiver 92 also provides a satellite ephemeris data output 94. This data is provided to the processor and network interface 95 which then transmits this data onto the communication network 96.

The satellite ephemeris data output 94 provides typically at least part of the entire raw 50 baud navigation binary data encoded in the actual GPS signals received from each GPS satellite. The satellite ephemeris data is part of the navigation message which is broadcast as the 50 bit per second data steam in the GPS signals from the GPS satellites and is described in great detail in the GPS ICD-200 document. The processor and network interface 95 receives this satellite ephemeris data output 94 and transmits it in real time or near real time to the communication network 96. This satellite ephemeris data is transmitted into the communication network and is received through the network at various location servers according to aspects of the present invention.

In certain embodiments of the present invention, only certain segments of the navigation message, such as the satellite ephemeris data may be sent to location servers in order to lower the bandwidth requirements for the network interfaces and for the communication network. Typically, also, this data may not need to be provided continuously. For example, only the first three frames which contain satellite clock and ephemeris information rather than all 5 frames together may be transmitted on a regular basis into the communication network 96. It will be appreciated that in one embodiment of the present invention, the location server may receive the entire navigation message which is transmitted from one or more GPS reference receivers into the network in real time or near real time in order to perform a method for measuring time related to satellite data messages, such as the method described in co-pending U.S. patent application Ser. No. 08/794,649, which was filed Feb. 3, 1997, by Norman F. Krasner. As used herein, the term "satellite ephemeris data" includes data which is only a portion of the satellite navigation message (e.g. 50 baud message) transmitted by a GPS satellite or at least a mathematical representation of this satellite ephemeris data. For example, the term satellite ephemeris data refers to at least a representation of a portion of the 50 baud data message encoded into the GPS signal transmitted from a GPS satellite. It will be also understood that the GPS reference receiver 92 decoded the different GPS signals from the different GPS satellites in view of the reference receiver 92 in order to provide the binary data output 94 which contains the satellite ephemeris data FIG. 4 shows an example of a cell based information source which in one embodiment may be maintained at a data processing station such as the GPS server 26 shown in FIG. 1. Alternatively, this information source may be maintained at a cellular switching center such as the cellular switching center 24 of FIG. 1 or at each cell site, such as cell site 13 shown in FIG. 1. Typically, however, this information is maintained and routinely updated at the location server which is coupled to the cellular switching center. The information source may maintain the data in various formats, and it will be appreciated that the format shown in FIG. 4 illustrates only one example of a format. Typically, each estimated altitude, such as estimated altitude 203, will include a corresponding location such as a cell site location or identification for a cell site or service area The information in the cell based information source 201 may be maintained in a database which includes cell object information, such as an identification of cell service areas or cell sites shown in columns 208 and 210 respectively and may also include cell site location such as the information shown in column 212. In the case of each estimated altitude, there is typically at least one of a cell site location or a cell site identification. It will be appreciated that each estimated altitude may be an average altitude of the geographical region covered by the radio signal coverage from a cell site. Other mathematical representations of the altitudes around the cell site may be used. It may be useful to use altitudes around the cell site rather than the altitude of the cell site particularly where the cell site's position may not be representative of the altitudes at which mobile SPS receivers can be found in the particular area.

Figure 5:
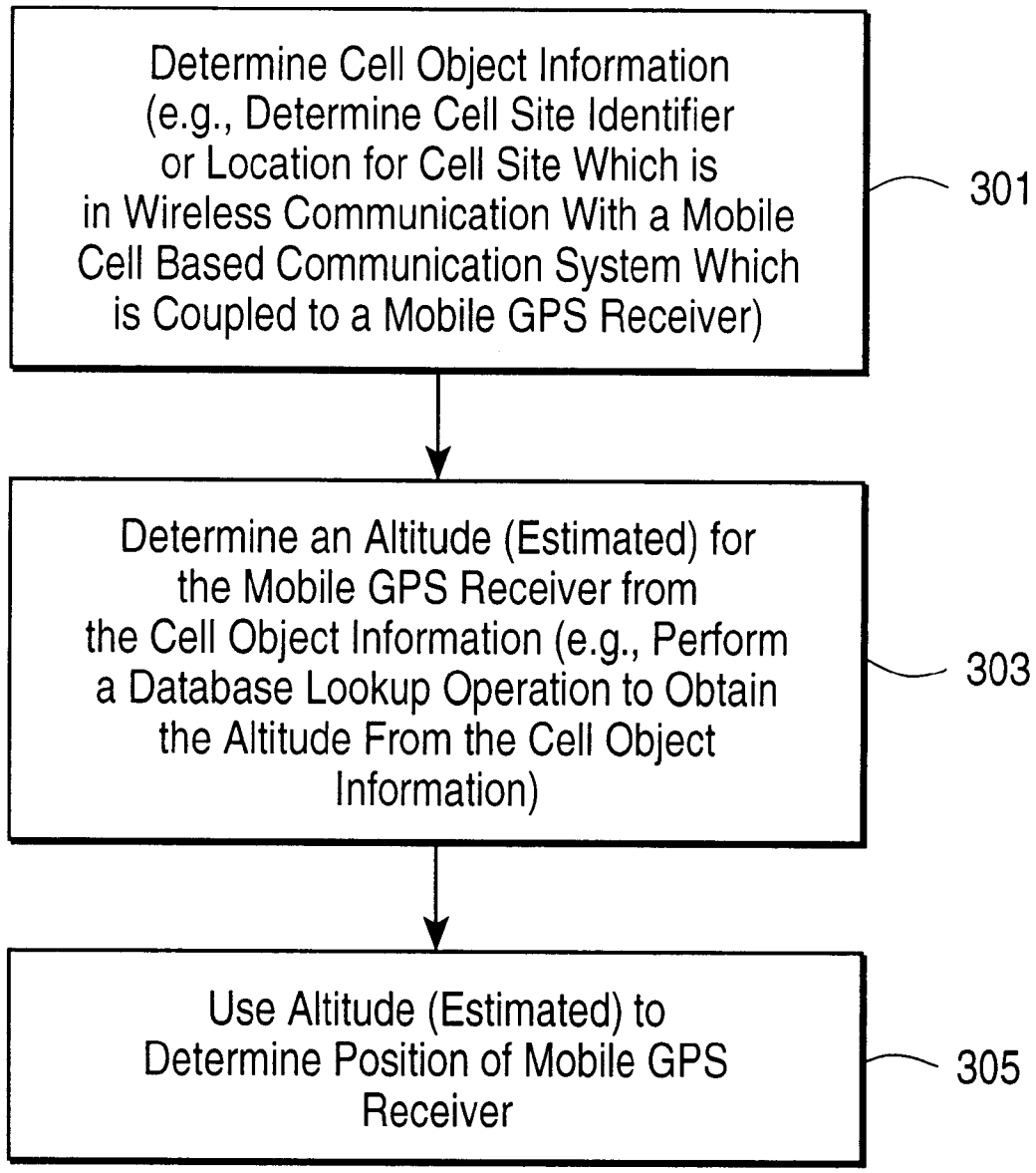
FIG. 5 illustrates a flowchart for one method which uses altitude aiding according to the present invention.

The use of the cell based information source 201 will now be described in conjunction with FIG. 5 which shows an example of a method of the present invention. In this following description, it will be assumed that the mobile SPS receiver will receive SPS signals and determine pseudoranges from those signals but will not complete a position solution calculation at the mobile receiver. Rather, the mobile receiver will transmit these pseudoranges to a particular cell site with which it is in radio communication and this cell site will forward the pseudoranges to a mobile switching center which will in turn forward the pseudoranges to a location server, such as the GPS server 26 of FIG. 1. This GPS server will then complete the position calculation using altitude aiding information according to an example of the present invention. In this particular example, a cell object information is determined in step 301. This may occur by the GPS server receiving a cell site identifier or a location for the cell site which is in wireless communication with a mobile cell based communication system which is coupled to the mobile SPS receiver, such as the receiver shown in FIG. 3A. For example, the cell site may forward its identifier information or may forward its location with the pseudorange information from the mobile SPS receiver to the GPS server. In step 303, the GPS server determines an estimated altitude for the mobile SPS receiver from the cell object information. In one example, the SPS server will perform a database lookup operation to obtain the estimated altitude by using the cell object information as an index into the database. This database may be maintained in the mass storage 55 shown in FIG. 2. If the location of the cell site is provided by providing a latitude and a longitude, the server may use this latitude and longitude to look up the altitude of the earth's surface at this point. Alternatively, in the case where a cell site identifier is provided such as a cell site number or other identification, then this cell object information will be used to obtain an estimated altitude; estimated altitude 205 is an example of such a situation where the cell site number B1 is used to identify estimated altitude 205. In step 305, the GPS server uses the estimated altitude to determine the position of the mobile GPS receiver. There are known ways in which the altitude may be used to augment or aid the position solution calculation.

Figure 5A:
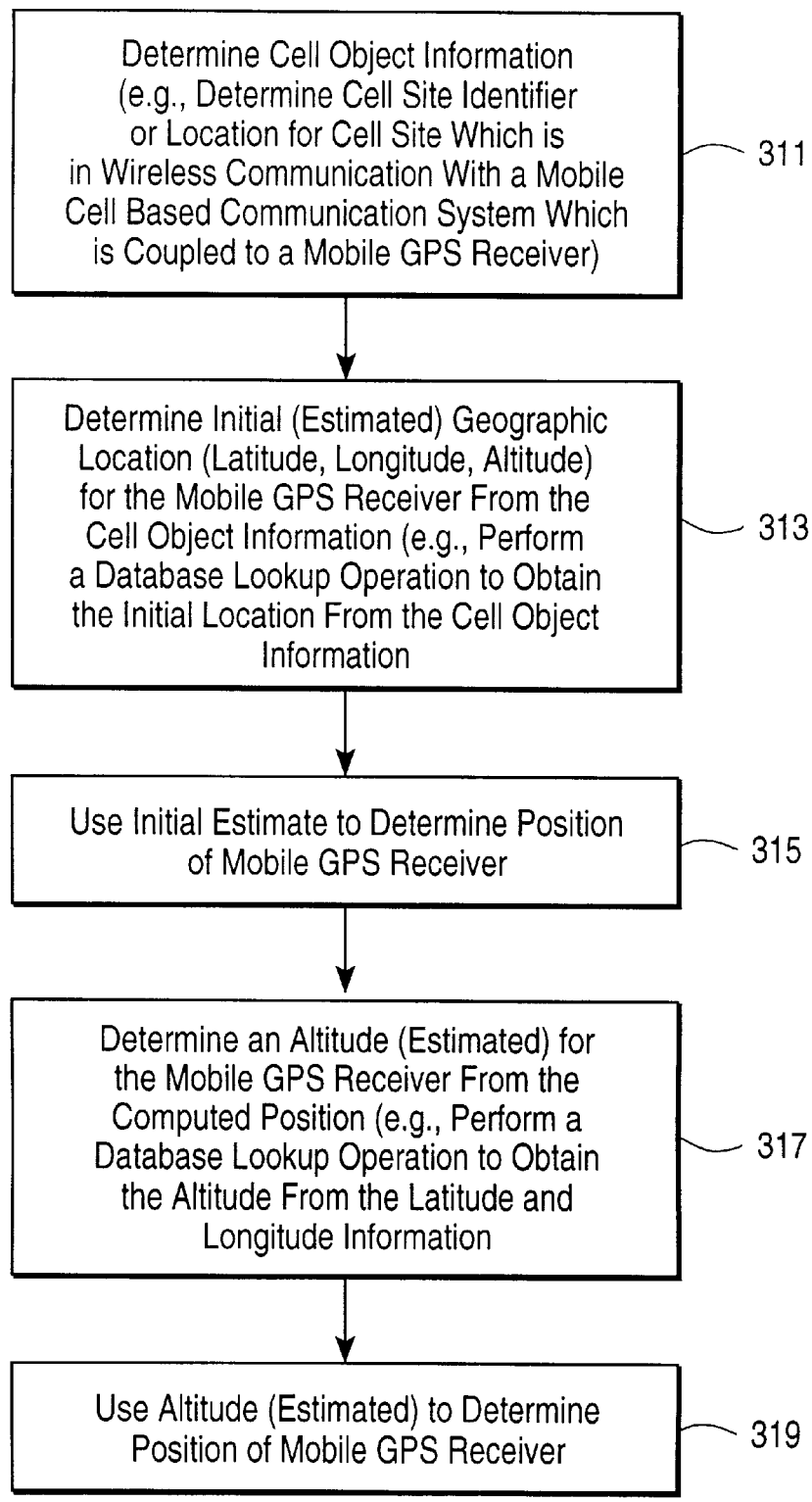
FIGS. 5A and 5B show two other flowcharts which represent methods for using altitude aiding according to the present invention.
Figure 5B:
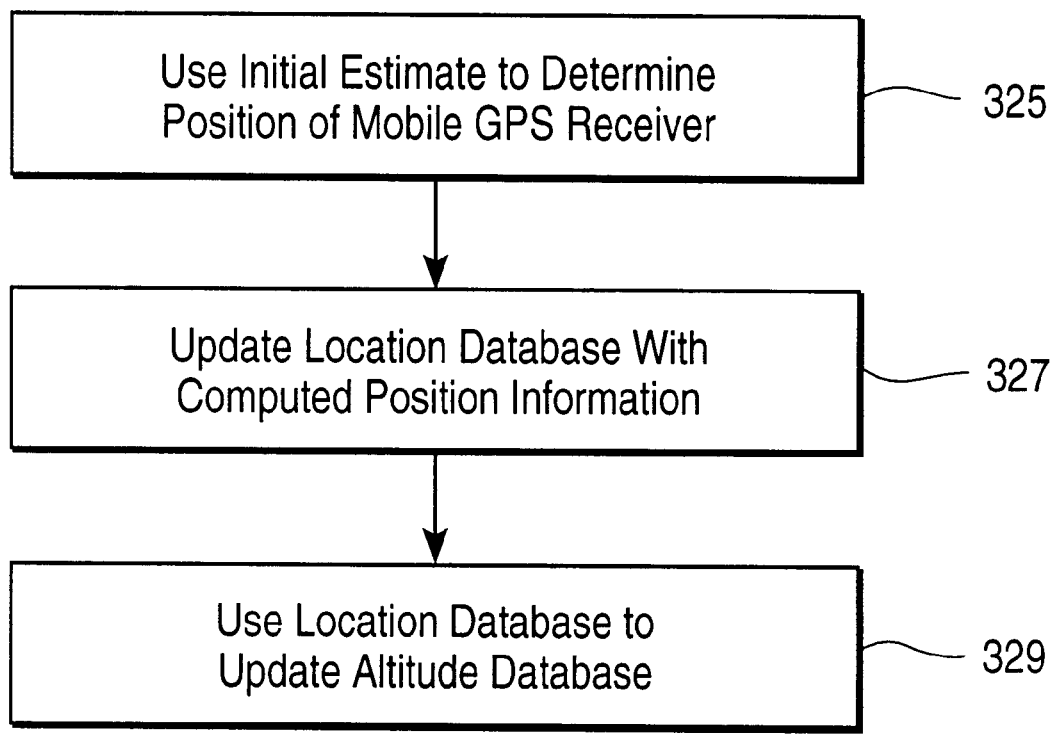

FIGS. 5A and 5B show methods in which an estimated altitude may be used in accordance with the present invention. The method of FIG. 5A begins at 311 in which cell object information is determined. This information is then used in 313 of FIG. 5A to determine an initial estimated geographic location (which may be specified as a latitude, longitude and altitude) for the mobile SPS receiver based upon the cell object information. In one example of this method, the cell object information is used as an index to look up in a database the estimated location which is associated with the cell object information. This estimated location is then used in 315 of FIG. 5A to calculate a position (e.g. a calculated latitude and longitude) of the mobile SPS receiver. This calculated latitude and longitude is then used in 317 of FIG. 5A to determine an estimated altitude; this may be done by performing a database look up operation on a second database to obtain the estimated altitude from the calculated latitude and longitude. In this case, the second database is similar to the database shown in FIG. 4 except that the second database used in FIG. 5A is more extensive in providing altitudes for many more possible combinations of latitudes and longitudes; while this second database used in FIG. 5A may not have an altitude for all possible combinations of latitudes and longitudes, interpolation logic may be used to determine an altitude through interpolation among altitudes in the database at latitudes and longitudes which are close to the calculated latitude and longitude. The altitude obtained in 317 of FIG. 5A may be used in 319 to again compute a position (effectively a refined position calculation).

The second database may be improved over time as it is used by adding latitude longitude/altitude combinations each time that a computed position is determined. That is, by using the system of the invention many times (e.g. each time "911" is pressed by a user of a cell phone), entries to the database can be added, and any altitude conflicts at a given latitude and longitude may be averaged (or flagged to be checked "manually" by an accurate GPS receiver reading). This will produce a robust three-dimensional database of the earth's surface over time. FIG. 5B shows an example of this method of adding entries to the second database. In step 325, the initial estimate of the location of a mobile SPS receiver is used to calculate a position of the mobile SPS receiver. The calculated position (latitude, longitude and altitude combination) is then used to update the second database (referred to as an altitude database in step 329).

While the foregoing description assumed a particular architecture, it will be appreciated that the present invention may be used in numerous architectures and in numerous other examples. For example, the altitude information may be stored at a cell site and transmitted to the location server or GPS server along with the pseudorange information from a mobile SPS receiver. This would eliminate the requirement that each GPS server maintain a database, although it may still be advantageous for a server to do so in case there are cell sites which the server communicates with and which do not have their own altitude information. In another alternative, the altitude information may be transmitted to the mobile SPS receiver which determines its own position in a conventional manner by acquiring and tracking SPS satellites, determining pseudoranges, reading satellite ephemeris information from the SPS satellites and determining its position. In yet another alternative, rather than transmitting the altitude to the mobile unit, a cell object information, such as a cell site identifier or cell site location may be transmitted to the mobile SPS receiver which maintains its own database showing an estimated altitude for a given cell object information. In this manner, the mobile SPS receiver can determine its own position and also perform altitude aiding autonomously. In yet another alternative embodiment, the mobile SPS receiver may merely collect the SPS signals and digitize them and then transmit this digitization of the SPS signals to the GPS server which determines pseudoranges from this digitized information and which completes the position calculation. In yet another alternative embodiment, satellite ephemeris data may be sent from a source, such as the SPS server, through the cell site to the mobile SPS receiver, and this satellite ephemeris data is used in conjunction with pseudoranges determined by the mobile SPS receiver to provide a position solution at the mobile SPS receiver. An example of this architecture is described in U.S. Pat. No. 5,365,450.

Another aspect of the present invention will be described now by referring to FIG. 6 which shows a method according to this aspect. The method shown in FIG. 6 relates to fault detection and isolation in a SPS receiver. While various fault detection and isolation (FDJ) techniques are known in the art (see for example Chapter 5 and Chapter 8 of *Global Positioning System: Theory and Applications,* Volume 2, B. W. Parkinson and J. J. Spilker, Jr., editors, American Institute of Aeronautics and Astronautics, Inc., 1996; and also see *Navigation System Integrity Monitoring Using Redundant Measurements* by Mark A. Sturza, NAVIGATION: Journal of the Institute of Navigation, Vol. 35, No. 4, Winter 1988–89, p. 483 et. seq.), these techniques have not utilized altitude aiding in a way to identify the presence of a faulty satellite pseudorange. Once a faulty satellite pseudorange is identified, it may be excluded from a recomputed navigation solution to improve the final position determination.

Figure 6:
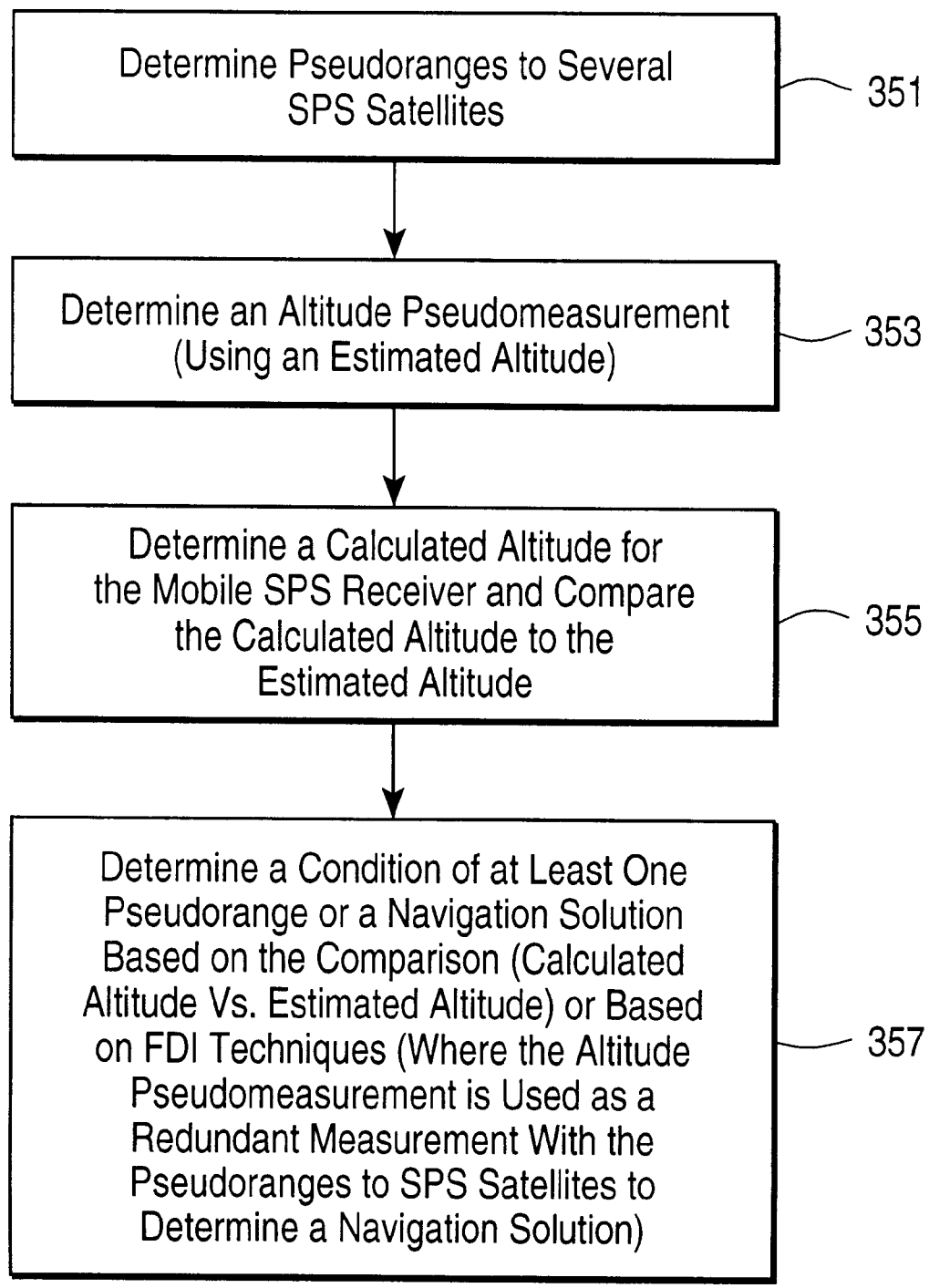
FIG. 6 is a flowchart showing other methods for using altitude aiding according to the present invention.

The method of FIG. 6 may begin in step 351 in which pseudoranges to several SPS satellites are determined. In step 353, an altitude pseudomeasurement is determined. This altitude pseudomeasurement may be considered a pseudorange to a satellite at the center of the earth and may be determined in the conventional manner of determining pseudomeasurements for altitude aiding which are utilized in the prior art. Thus, for example, this altitude pseudomeasurement can be visualized as a radius, which includes the earth's radius from the earth's center to a point above the earths assumed spherical surface at an estimated altitude with respect to the earth's surface, defined by an ellipsoid. The estimated altitude may be derived as shown in FIG. 5 (steps 301 and 303). In step 355, an altitude for the mobile SPS receiver is calculated and this calculated altitude is compared to the estimated altitude. The calculated altitude may be obtained from a navigation solution based on the pseudoranges determined in step 351. The difference between these two values, if large enough, will indicate a possible faulty satellite pseudorange or possible faulty navigational solution, which may exist in the case of large multipath errors which cause large errors in a vertical direction as often occurs in an urban canyon situation. In step 357, the condition of at least one pseudorange may be determined based upon this comparison. If the comparison shows a small difference between the estimated altitude and the calculated altitude then the condition of the pseudoranges may be such that they are not at fault. On the other hand, if the difference between the estimated altitude and the calculated altitude is sufficiently large (e.g. the difference exceeds a threshold), then at least one of the pseudoranges (and/or a navigation solution) may be faulty.

Also shown in step 357 is an alternative method which does not rely on the comparison between an estimated altitude and a calculated altitude. This alternative method may be performed instead of the comparison or in addition to the comparison. This alternative method uses the altitude pseudomeasurement (from step 353) as a redundant measurement (redundant to the pseudoranges from step 351) and uses FDI techniques which use redundant measurements to detect whether a faulty pseudorange (or faulty navigation solution) exists and to identify at least one faulty pseudorange if one exists. These FDI techniques are described in the literature; see, for example, Sturza, "Navigation System Integrity Monitoring Using Redundant Measurements" refereed to above. After identifying the faulty pseudorange(s), they may be excluded from a re-computed navigation solution. It will be appreciated that a cellular pseudorange (described in co-pending U.S. patent application Ser. No. 09/064,673, filed Apr. 22, 1998 and entitled "Satellite Positioning System Augmentation with Wireless Communication Signals") may be used as a redundant measurement with these FDI techniques. An example of a cellular pseudorange is a time difference of arrival of a communication radio frequency signal in a CDMA or other cellular (cell based) communication system; the cellular pseudorange typically represents a time of travel of a communication signal between a cell site at a known location and the mobile SPS receiver which includes a cell based communication system.

The methods of FIG. 6 may identify a particular pseudorange to a particular satellite as "bad" even though the SPS signals from the particular satellite have a high signal-to-noise ratio (SNR). In this case, the invention may reject this identification and continue to use the FDI techniques to find another faulty pseudorange.

The methods of FIG. 6 may be used in a non-cell based system in which a single basestation is in point-to-point radio communication with a mobile SPS receiver. In this case, the estimated altitude may be an average altitude of the geographical region covered by radio signals to or from the basestation. In this particular example, no cell object information needs to be transmitted through a network. In another alternative, the method of FIG. 6 may be used in a cell based communication system in which a cell object information is transmitted from components in a network and ultimately used as an index to a database to derive an estimated altitude.

While the foregoing description has generally assumed a system architecture in which a mobile SPS receiver determines pseudoranges and transmits these pseudoranges to a remotely located SPS server, it will be understood that the present invention is also applicable to other system architectures. For example, the present invention may be employed in a system in which a mobile SPS receiver transmits digitized SPS signals (with a time stamp showing time of reception) to a remotely located SPS server (without computing pseudoranges to SPS satellites), and the remotely located SPS server determines an estimated altitude and determines a position solution (which may also be examined with FDI techniques as described herein). In another example, the present invention may be employed in a system in which a mobile SPS receiver determines its own position with or without assistance from a remotely located SPS server. Without such assistance, the mobile SPS receiver may perform FDI techniques based on an estimated altitude with the aid of an altitude estimate provided by a user or transmitted to the mobile SPS receiver from a cell site (the mobile SPS receiver may determine a cell site identification from its cell based communications with the cell site and look up in its own database an estimated altitude which corresponds to the cell site). With such assistance, the mobile SPS receiver may determine its own position by receiving satellite ephemeris data and/or Doppler information and/or satellite almanac from an SPS server (e.g. transmitted from a cell site to the mobile SPS receiver) and may also receive and use an altitude estimate from an SPS server, in this case, the mobile SPS receiver may determine its position (after determining satellite pseudoranges) and may perform FDI techniques on the position solution using the altitude estimate.

Although the methods and apparatus of the present invention have been described with reference to GPS satellites, it will be appreciated that the teachings are equally applicable to positioning systems which utilize pseudolites or a combination of satellites and pseudolites. Pseudolites are ground based transmitters which broadcast a PN code (similar to a GPS signal) which may be modulated on an L-band carrier signal, generally synchronized with GPS time. Each transmitter may be assigned a unique PN code so as to permit identification by a remote receiver. Pseudolites are useful in situations where GPS signals from an orbiting satellite might be unavailable, such as tunnels, mines, buildings or other enclosed areas. The term "satellite", as used herein, is intended to include pseudolite or equivalents of pseudolites, and the term GPS signals, as used herein, is intended to include GPS-like signals from pseudolites or equivalents of pseudolites.

In the preceding discussion the invention has been described with reference to application upon the United States Global Positioning Satellite (GPS) system. It should be evident, however, that these methods are equally applicable to similar satellite positioning systems, and in, particular, the Russian Glonass system. The Glonass system primarily differs from GPS system in that the emissions from different satellites are differentiated from one another by utilizing slightly different carrier frequencies, rather than utilizing different pseudorandom codes. The term "GPS" used herein includes such alternative satellite positioning systems, including the Russian Glonass system.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method for determining a position of a mobile satellite positioning system (SPS) receiver, said method comprising:

determining a plurality of satellite pseudoranges between said mobile SPS receiver and a corresponding plurality of satellites;

determining at least one non-satellite pseudomeasurement;

determining a condition of at least one of said plurality of satellite pseudoranges.

2. A method as in claim 1 wherein said non-satellite pseudomeasurement is one of an altitude pseudomeasurement or a cellular pseudorange.

3. A method as in claim 2 wherein said condition is determined from said non-satellite pseudomeasurement being a redundant measurement.

4. A method as in claim 3 wherein said condition is determined using SPS fault detection and isolation techniques.

5. A method as in claim 4 wherein said corresponding plurality of satellites comprise a plurality of satellites orbiting in space around the earth.

6. A method as in claim 4 wherein said position is determined from a position solution algorithm and wherein if said condition is a first state said at least one of said plurality of satellite pseudoranges is used in said position solution algorithm.

7. A method as in claim 6 wherein if said condition is a second state, said at least one of said plurality of satellite pseudoranges is not used in said position solution algorithm.

* * * * *